United States Patent
Keller et al.

(10) Patent No.: US 7,410,113 B2
(45) Date of Patent: Aug. 12, 2008

(54) MODULAR TORSION BAR

(75) Inventors: Gerald Keller, Shelby Township, MI (US); Lloyd Snyder, Oxford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 374 days.

(21) Appl. No.: 11/008,307

(22) Filed: Dec. 9, 2004

(65) Prior Publication Data

US 2006/0124793 A1 Jun. 15, 2006

(51) Int. Cl.
*B60R 22/28* (2006.01)
*B65H 75/48* (2006.01)

(52) U.S. Cl. .......... 242/379.1; 242/382; 242/382.5; 280/805; 297/470; 297/471; 297/472; 267/273; 267/154

(58) Field of Classification Search .......... 242/379.1, 242/382, 382.5; 280/805, 806; 297/470–472; 74/439, 440, 451; 29/520, 525; 464/97, 464/88, 91; 267/154, 188, 273; *B60R 22/28, B60R 22/36*

See application file for complete search history.

(56) References Cited

U.S. PATENT DOCUMENTS

| | | | | |
|---|---|---|---|---|
| 2,058,618 A | * | 10/1936 | Patzig | .......... 403/273 |
| 5,520,376 A | * | 5/1996 | Langa et al. | .......... 267/273 |
| 5,522,564 A | | 6/1996 | Schmidt et al. | |
| 5,547,143 A | | 8/1996 | Miller, III et al. | |
| 5,799,893 A | * | 9/1998 | Miller et al. | .......... 242/379.1 |
| 5,820,058 A | * | 10/1998 | Hirzel et al. | .......... 242/379.1 |
| 5,938,135 A | | 8/1999 | Sasaki et al. | |
| 5,979,209 A | * | 11/1999 | Belliato et al. | .......... 72/340 |
| 6,012,667 A | * | 1/2000 | Clancy et al. | .......... 242/379.1 |
| 6,029,924 A | * | 2/2000 | Ono et al. | .......... 242/379.1 |
| 6,105,893 A | | 8/2000 | Schmidt et al. | |
| 6,105,894 A | | 8/2000 | Singer et al. | |
| 6,241,172 B1 | * | 6/2001 | Fugel et al. | .......... 242/379.1 |
| 6,267,314 B1 | | 7/2001 | Singer et al. | |
| 6,360,980 B1 | * | 3/2002 | Lee | .......... 242/379.1 |
| 6,364,238 B1 | | 4/2002 | Weller | |
| 6,367,729 B1 | * | 4/2002 | Inagawa et al. | .......... 242/379.1 |
| 6,616,081 B1 | | 9/2003 | Clute et al. | |
| 6,729,649 B1 | | 5/2004 | Schmidt | |
| 2002/0038834 A1 | * | 4/2002 | Mishina et al. | .......... 242/379.1 |
| 2003/0034644 A1 | * | 2/2003 | Wier | .......... 280/806 |

* cited by examiner

*Primary Examiner*—Peter M. Cuomo
*Assistant Examiner*—Stefan Kruer
(74) *Attorney, Agent, or Firm*—Sally J Brown; Brinks Hofer Glison & Lione

(57) ABSTRACT

A seatbelt retractor is disclosed. The seatbelt retractor has a frame, a spindle, a seatbelt webbing and torsion bar. The frame is attached to a structure of a road vehicle. The spindle is rotatably supported by the frame. The seatbelt webbing is wound about the spindle for retraction there to and protraction there from. The torsion bar is fixedly coupled to the spindle for rotation therewith, the torsion bar has a first torsion portion mechanically coupled or press-fitted into a second torsion portion.

25 Claims, 3 Drawing Sheets

MODULAR TORSION BAR

TECHNICAL FIELD

The present invention relates to seatbelt retractors for retracting and protracting seatbelt webbing from a spindle and to retractors that have load limiting capability and to methods of making same.

BACKGROUND

Vehicle manufactures are required to provide seatbelt restraint systems in almost all road vehicles today. Typically, these restraint systems include a retractor, a seatbelt webbing, a latch plate and a seatbelt buckle. When the seatbelt system is not in use, the seatbelt webbing is retracted into the retractor and wound about a spindle disposed in the retractor. When in use, the seatbelt webbing is protracted from the retractor, wrapped around the occupant and secured by the latch plate to the seatbelt buckle.

In an effort to improve the safety of an occupant during a vehicle crash, retractors having torsion bars have been developed to limit the forces applied by the seatbelt on the vehicle occupant. The torsion bar is fixed to a spindle on a first end and to a tread head on a second end. As the seatbelt webbing is loaded by a vehicle occupant during a crash, the torsion bar twists allowing the spindle to rotate and pay out additional webbing to reduce the peak forces on the occupant. Depending on the occupant's size and the severity of the crash, different amounts of webbing pay out and a corresponding level of twisting of the torsion bar is appropriate.

To achieve different load limiting characteristics and degrees of webbing pay out during a vehicle collision, retractors have been developed having multiple torsion bar segments which may be activated independently depending on the size of the occupant and the severity of the collision. While these new and improved multi-level load limiting retractors achieve their intended purpose, many issues still exist. For example, manufacturing of torsion bars that provide multiple levels of load limiting are much more complex and, consequently, more expensive to manufacture than retractors having a single load limiting level torsion bar. Therefore, a need exists for a method of constructing multi-level load limiting retractors in a feasible and cost effective manner.

SUMMARY

In an aspect of the present invention a seatbelt retractor is provided. The seatbelt retractor has a frame, a spindle, a seatbelt webbing and a torsion member. The frame is attached to a structure of a vehicle. The spindle is rotatably supported by the frame. The seatbelt webbing is wound about the spindle for retraction there to and protraction there from. The torsion member is fixedly coupled to the spindle for rotation therewith. Moreover, the torsion member has a first torsion portion mechanically coupled to a second torsion portion.

In another aspect of the present invention, the first torsion portion is press-fit into the second torsion portion.

In yet another aspect of the present invention, the second torsion portion is coupled to a third torsion portion.

In yet another aspect of the present invention, the first torsion portion has a first engagement portion.

In yet another aspect of the present invention, the second torsion portion has a second engagement portion.

In yet another aspect of the present invention, the first engagement portion is a spline.

In yet another aspect of the present invention, the second engagement portion is a spline.

In yet another aspect of the present invention, the first engagement portion is a rotary pretensioner pinion.

In still another aspect of the present invention, the first torsion portion has a diameter that is greater than a diameter of the second torsion portion.

In still another aspect of the present invention, the first torsion portion has a length that is greater than a length of a second torsion portion.

In still another aspect of the present invention, the first torsion portion has a transition area between an end of the first torsion portion and a mid-point of the first torsion portion.

In still another aspect of the present invention, the first torsion portion has an end having a square cross-section.

In yet another aspect of the present invention, the first torsion portion has an end having a rectangular cross-section.

In yet another aspect of the present invention, the first torsion portion has an end having non-circular cross-section.

In yet another aspect of the present invention, the first torsion portion has an end having a rectangular cross-section.

These and other aspects and advantages of the present invention will become apparent upon reading the following detailed description of the invention in combination with the accompanying drawings.

DESCRIPTION

Figure 1:
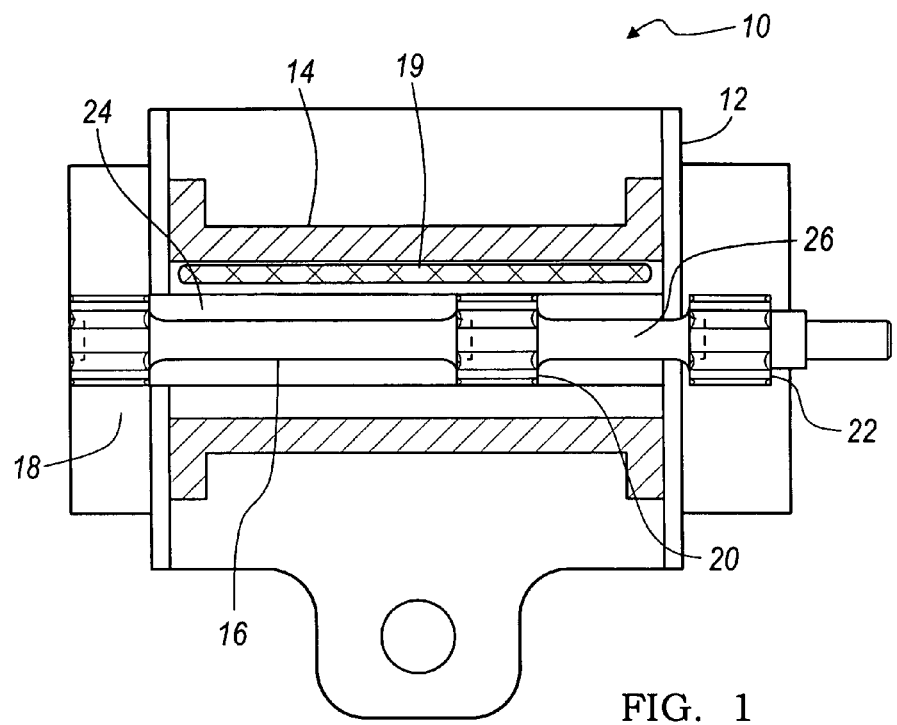
FIG. 1 is a perspective view of a seatbelt retractor having a torsion bar rotationally coupled to a spindle, in accordance with an embodiment of the present invention.

Referring now to FIG. 1, a perspective view of a seatbelt retractor 10 is illustrated, in accordance with an embodiment of the present invention. Retractor 10 includes, generally, a frame 12 typically mounted to a vehicle structure (not shown), a spindle 14 rotatably mounted within frame 12 and a torsion bar 16 rotatably coupled to the spindle and supporting same within frame 12. Spindle 14 is rotated in a first direction to wind a seatbelt 17 when the retractor is in a retracting mode and rotate in a second direction to unwind the seatbelt from spindle 14 when the retractor is in a protracting mode. Torsion bar 16 includes a first end spline 18, an intermediate spline 20 and a second end spline 22. Torsion bar 16 further includes a first torsion bar portion 24 and a second torsion bar portion 26. First torsion bar portion 24 extends between first end spline 18 and intermediate spline 20. Second torsion bar portion 26 extends between intermediate spline 20 and second end spline 22.

In a first retractor operating state, end spline 18 is held fixed rotationally relative to frame 12 and second end spline 22 is allowed to rotate with spindle 14. Further, in the first retractor operating state intermediate spline 20 is rotationally fixed to spindle 14 and continues to rotate with spindle 14 after end spline 18 is held in place causing torsion bar portion 24 to twist. In a second retractor operating state, torsion bar 16 is rotationally fixed at second end spline 22 and is free to rotate at first end spline 18. Thus, in the second retractor operating state, torsion bar portion 26 twists as spindle 14 continues to rotate under seatbelt loading by the vehicle occupant. The twisting of torsion bar portions 24, 26 allows seatbelt webbing 17 to protract an additional amount after splines 18, 22 have been rotationally fixed. The dual retractor operating states just described provide different load limiting levels to accommodate different sized occupants as well as different crash severities.

Figure 2:
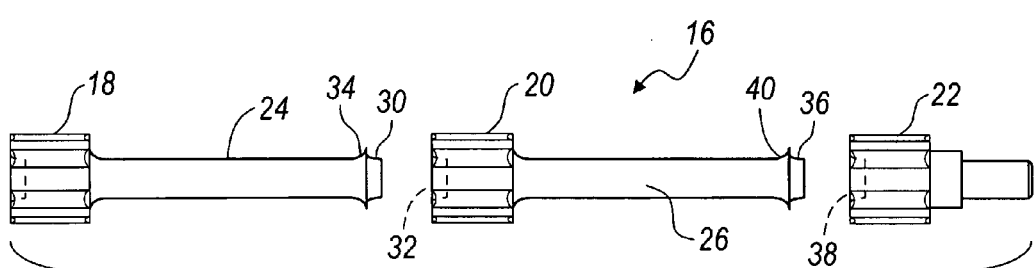
FIG. 2 is a perspective view of a multi-segmented torsion bar, in accordance with an embodiment of the present invention.

Referring now to FIG. 2, torsion bar 16 is illustrated in a deconstructed state to further illustrate the method for constructing and assembling torsion bar 16, in accordance with an embodiment of the present invention. As previously described and illustrated, torsion bar 16 has a first torsion bar portion 24 that extends between first end spline 18 and intermediate spline 20. As illustrated in FIG. 2, first torsion bar portion 24 may be configured having a profiled end portion 30. Profiled end portion 30 is configured to mate with a corresponding aperture 32 disposed in intermediate spline 20. Moreover, profiled end portion 30 is oversized relative to aperture 32 to create an interference fit with aperture 32. Thus, torsion bar 16 may be constructed by press-fitting profiled end portion 30 into aperture 32.

A transition area 34 is provided between profiled end portion 30 and the rest of first torsion bar portion 24 to prevent shearing at the transitional area. Generally, transition area 34 includes a surface having a radius extending from the first torsion bar portion 24 to profiled end portion 30. Second torsion bar portion 26 has an end 36 which is configured in a similar manner to end 30. That is, end 36 is profiled and cooperates with a mating aperture 38 disposed within second end spline 22. Again, end 36 is oversized to create an interference fit (or press-fit) with aperture 38. A transitional portion 40 is disposed between profiled end 36 and the rest of the second torsion bar portion 26. Generally, transition area 40 includes a surface having a radius extending from second torsion bar portion 26 to profiled end portion 36. Thus, as can be readily seen, this configuration allows constructions of torsion bars having multiple and disparate torsion bar portions disposed between multiple end and intermediate splines. Accordingly, this torsion bar construction and method of assembly provides a cost effective and relatively low complexity method for producing multi-load limiting torsion bars and retractors.

Figure 3:
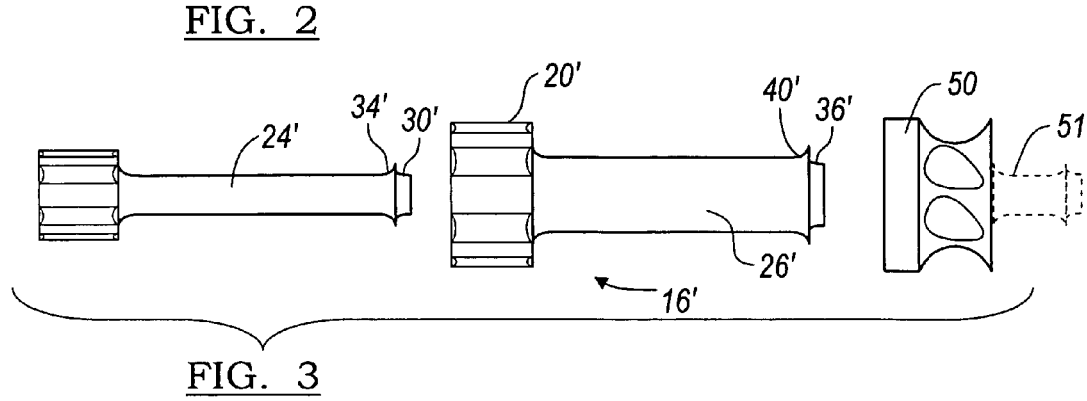
FIG. 3 is a perspective view of a multi-segmented torsion bar having segments or portions that have different cross-sectional diameters, in accordance with an embodiment of the present invention.

Referring now to FIG. 3, an alternative configuration of a torsion bar 16' is illustrated, in accordance with an embodiment of the present invention. Alternate torsion bar 16' illustrated in FIG. 3, is similarly constructed using profiled ends 30' and 36' that are press-fit into apertures (not shown) disposed within end splines 20' and pretensioner sprocket 50. Torsion bar 16' includes transition portions 34' and 40' that provide a radiused transition to prevent shearing at this portion of the torsion bar area. Torsion bar 16' may have different splines or end configurations connected to profiled ends 30' or 36'. For example, as illustrated in FIG. 3, a pretensioner sprocket 50 is matingly connected (press-fit) to profiled end 36' to interact with a pretensioner device. Further, first and second torsion bar portions 24' and 26' may have different cross-sectional diameters, as illustrated in FIG. 3. Thus, the present construction and method for producing multi-load limiting torsion bars allows for easy assembly of torsion bars having different size and shaped sprockets, splines and/or torsion bar portions. This is further illustrated in FIGS. 4 and 5. For example, in FIG. 4, a torsion bar 60 may be assembled using the configuration and method of construction assembly as previously described. Torsion bar 60 has a first torsion bar portion 62 having integrally formed first and second end splines 66 and 68 and second torsion bar 64. Further, as illustrated, first torsion bar 62 has a first predefined diameter and a predefined length L. Second torsion bar portion 64 may have a length L' that is different than the length of first torsion bar portion 62. The different lengths, shapes and diameters of the various torsion bar portions dictate the degree of twisting of the torsion bar portions that will occur under different loading conditions (i.e. different sized occupants and crash severities).

Figure 4:
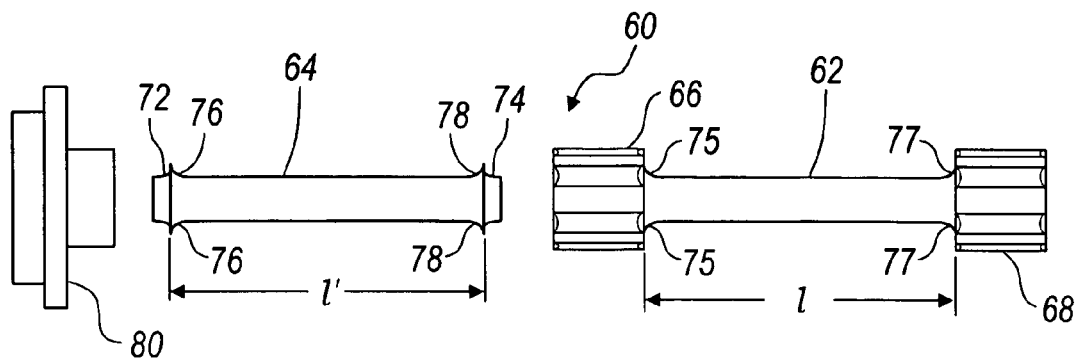
FIG. 4 is a perspective view of a multi-segmented torsion bar having different segment lengths, in accordance with an embodiment of the present invention.

As illustrated in FIG. 4, second torsion bar portion 64 has profiled ends 72 and 74. Further, first and second torsion bar portions 63 and 64 includes radiused transition areas 75, 76, 77 and 78 to prevent shearing in these portions as previously described. Profiled end 72 is matingly received and press-fit into an aperture (not shown) disposed within a tread head 80 to rotationally fix tread head 80 to torsion bar portion 64. In this manner, torsion bar 60 may be constructed having different end portions, splines and/or tread heads.

Figure 5:
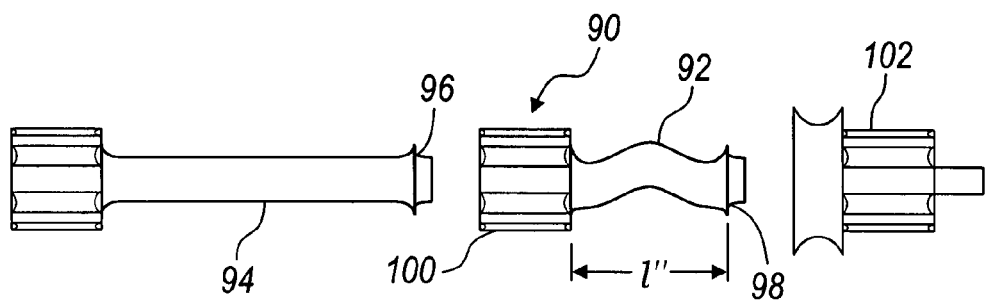
FIG. 5 is a perspective view of a multi-segmented torsion bar having different shaped segments, in accordance with an embodiment of the present invention.

As further illustrated in FIG. 5, a multi-level load limiting torsion bar 90 may be constructed having different shaped torsion bar portions 92 and 94. As shown in FIG. 5, torsion bar portion 92 has a curved or "S-shaped" profile and may vary in length "L". Torsion bar portions 92, 94 have end portions 96 and 98 that are profiled and cooperate through an interference or press-fit with apertures (not shown) disposed within a spline 100 or other end pieces, such as a pretensioner spindle end cap for a dual mode pretensioner designated by reference number 102.

Figure 6A:
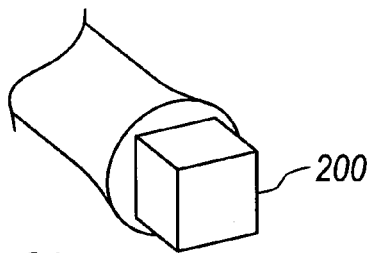
FIG. 6A-6D are perspective end views of torsion bar segments, in accordance with an embodiment of the present invention.
Figure 6B:
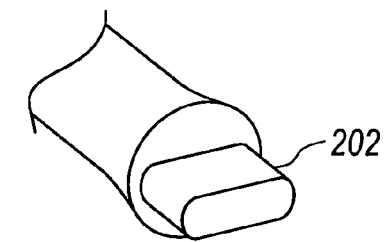
Figure 6C:
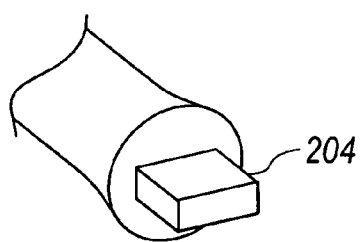
Figure 6D:
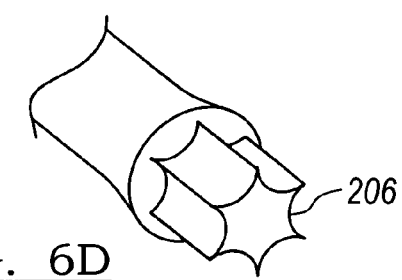

FIGS. 6A-6D illustrate the various end profiles that the ends of the torsion bar portions described above may have to transmit the torque between one torsion bar portion to the other torsion bar portion, in accordance with an embodiment of the present invention. For example, FIG. 6A, shows a profiled end 200 of a torsion bar portion (i.e., torsion bar portions 24, 24', 26, 26', 62, 64, 92 and 94) wherein the profiled end 200 has a square cross-section. FIG. 6B illustrates a profiled end 202 of a torsion bar portion that has an ovular cross-section. FIG. 6C illustrates a profiled end 204 that has a rectangular cross-section. FIG. 6D has a profiled end 206 that has a star shaped cross-section. As can be readily seen from the examples described above, various profiled end shapes may be used to ensure that torque is transferred between the different torsion bar portions.

Figure 7A:
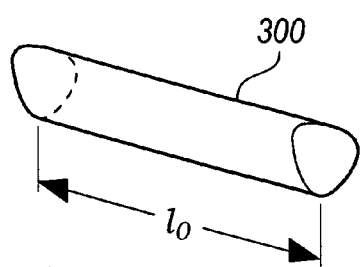
FIGS. 7A-7C are perspective views of torsion bar segments having different shaped cross-sections, in accordance with an embodiment of the present invention.
Figure 7B:
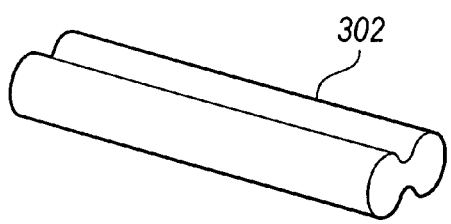
Figure 7C:
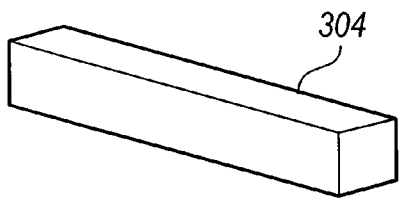

Referring now to FIGS. 7A-7C, various torsion bar portions 300, 302, 304 are illustrated, in accordance with an embodiment of the present invention. As illustrated in FIGS. 7A-7C, torsion bar portions 300, 302, 304, which may be used in place of the previously described torsion bar portions (i.e., 24, 24', 26, 26', 62, 64, 92 and 94) may have different cross-sectional shapes. As shown in FIG. 7A, torsion bar portion 300 has a non-circular cross-section and an overall length $l_o$. In another embodiment as shown in FIG. 7B, torsion bar portion 302 is shown having a cross-sectional shape in the form of a figure eight. FIG. 7C shows torsion bar portion 304, which has a square or rectangular cross-section. Of course, the present invention contemplates other shapes for the various torsion bar portions to achieve the appropriate load limiting required for different occupant sizes and vehicle collisions severities. It should be appreciated after reading the above text that load limiting capability of the retractor may be varied by an appropriate selection of the torsion bar portions having a prescribed shape and length.

Figure 8A:
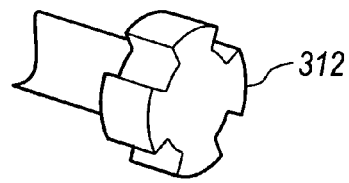
FIGS. 8A-8D are perspective views of end profiles of a torsion bar, in accordance with an embodiment of the present invention.
Figure 8B:
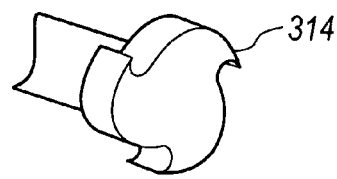
Figure 8C:
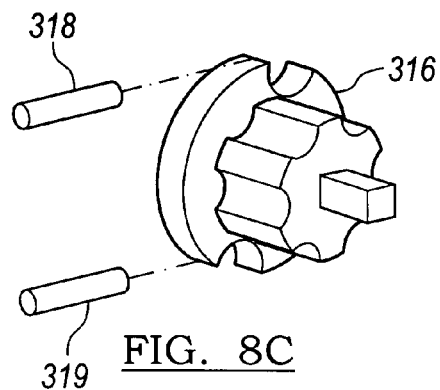
Figure 8D:
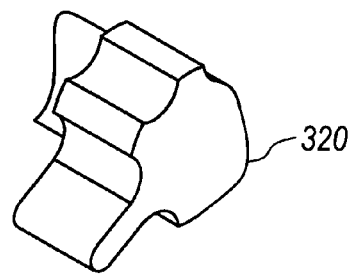

Referring now to FIGS. 8A-8D, various torsion bar end portions 312, 314, 316, 320 are illustrated, in accordance with an embodiment of the present invention. For example, in FIGS. 8A and 8B, illustrate various end spline shapes that may be utilized and connected (press-fit) to the various torsion bar portions, in accordance with the configurations and methods previously described. Further, FIG. 8C illustrates a spindle 316 with retaining pins 318, 319 for a dual mode pretensioner, as well known in the prior art. Spindle 316 may be easily mated with and rotationally fixed to any of the torsion bar portions described above using the configurations and methods previously described. Of course, many other end configurations or splines may be constructed and utilized as shown in FIG. 8D, where a low profile spline 320 is illustrated, low profile spline 320 may be used to prevent interference with seatbelt webbing 19 that is threaded through the spindle 14 of retractor 10.

As any person skilled in the art of seatbelt retractors for retracting and protracting seatbelt webbing from a spindle and which have load limiting capability will recognize from the previous detailed description and from the figures and claims, modifications and changes can be made to the preferred embodiments of the invention without departing from the scope of this invention defined in the following claims.

We claim:

1. A seatbelt retractor comprising:
   a frame attached to a structure of a vehicle;
   a spindle rotatably supported by the frame;
   a seatbelt webbing wound about the spindle for retraction there to and protraction there from; and
   a torsion member coupled to the spindle for rotation therewith, the torsion member having a first torsion portion mechanically coupled to a second torsion portion, the first torsion portion having a profiled end, the second torsion portion having an aperture receiving the profiled end, each of the first and second torsion portions having a length less than a length of the spindle.

2. The seatbelt retractor of claim 1 wherein the first torsion portion is press-fit into the second torsion portion.

3. The seatbelt retractor of claim 1 wherein the second torsion portion is coupled to a third torsion portion.

4. The seatbelt retractor of claim 1 wherein the first torsion portion has a first engagement portion.

5. The seatbelt retractor of claim 1 wherein the second torsion portion has a second engagement portion.

6. The seatbelt retractor of claim 1 wherein the first torsion portion has a diameter that is greater than a diameter of the second torsion portion.

7. The seatbelt retractor of claim 1 wherein the first torsion portion has a length that is greater than a length of a second torsion portion.

8. The seatbelt retractor of claim 1 wherein the first torsion portion has a transition area between the profiled end of the first torsion portion and a mid-point of the first torsion portion.

9. The seatbelt retractor of claim 1 wherein the profiled end has a square cross-section.

10. The seatbelt retractor of claim 1 wherein profiled end has a rectangular cross-section.

11. The seatbelt retractor of claim 1 wherein the profiled end has a non-circular cross-section.

12. The seatbelt retractor of claim 1 wherein the first torsion portion has a first end adapted to be rotationally fixed end a second end opposite the first end, and wherein the second torsion portion has a first end adapted to be rotationally fixed and a second end opposite the first end, and wherein the second end of the first torsion portion includes the profiled end and the second end of the second torsion portion includes the aperture receiving the profiled end.

13. The seatbelt retractor of claim 4 wherein the first engagement portion is a spline.

14. The seatbelt retractor of claim 5 wherein the second engagement portion is a spline.

15. The seatbelt retractor of claim 13 wherein the first engagement portion is a rotary pretensioner pinion.

16. The seatbelt retractor of claim 11 wherein the first torsion portion has a radiused transition area proximate the profiled end.

17. A seatbelt retractor comprising:
    a frame attached to a structure of a vehicle;
    a spindle rotatably supported by the frame;
    a seatbelt webbing wound about the spindle for retraction there to and protraction there from; and
    a torsion bar fixedly coupled to the spindle for rotation therewith, the torsion bar including a first torsion bar portion having a first end and a second torsion bar portion having an aperture, the first end of the first torsion bar portion being press-fitted to the aperture of the second torsion bar portion, the first end of the first torsion bar portion being located between opposing ends of the spindle.

18. The seatbelt retractor of claim 17 wherein the first torsion bar portion has a spline to selectively engage and rotationally fix the first torsion bar portion.

19. The seatbelt retractor of claim 17 wherein the second torsion bar portion has a spline to selectively engage and rotationally fix the second torsion bar portion.

20. The seatbelt retractor of claim 17 wherein the first torsion bar portion has a diameter that is greater than a diameter of the second torsion bar portion.

21. The seatbelt retractor of claim 17 wherein the first torsion bar portion has a length that is greater than a length of a second torsion bar portion.

22. The seatbelt retractor of claim 17 wherein the first torsion bar portion has a transition area between an end of the first torsion bar portion and a mid-point of the first torsion bar portion.

23. The seatbelt retractor of claim 17 wherein the first end has a square or rectangular cross-section.

24. The seatbelt retractor of claim 17 wherein the first end has a non-circular cross-section.

25. The seatbelt retractor of claim 17 wherein the first torsion bar portion has a radiused transition area proximate the first end.

* * * * *